United States Patent [19]

Dang

[11] 4,410,935
[45] Oct. 18, 1983

[54] CURRENT OVERLOAD PROTECTION FOR INVERTER OF UNINTERRUPTIBLE POWER SUPPLY SYSTEM

[75] Inventor: Gurcharn S. Dang, Schaumburg, Ill.

[73] Assignee: General Signal Corporation, Stamford, Conn.

[21] Appl. No.: 246,510

[22] Filed: Mar. 23, 1981

[51] Int. Cl.³ ............................................. H02H 7/122
[52] U.S. Cl. ...................................... 363/37; 363/56; 363/41; 363/98
[58] Field of Search ...................... 307/66; 363/37, 38, 363/41, 42, 51, 56, 80, 98, 132, 17, 55; 361/95, 96, 87

[56] References Cited

U.S. PATENT DOCUMENTS

| | | | |
|---|---|---|---|
| 3,659,186 | 4/1972 | Machida et al. | 361/87 |
| 4,000,446 | 12/1976 | Vandevier | 361/96 |
| 4,013,938 | 3/1977 | McCoy | 363/56 |
| 4,038,695 | 7/1977 | DePuy | 361/96 |
| 4,071,812 | 1/1978 | Walker | 363/17 |
| 4,121,281 | 10/1978 | Banga | 363/17 |
| 4,167,776 | 9/1979 | Nygaard | 363/56 |
| 4,250,532 | 2/1981 | Davis | 361/96 |
| 4,316,097 | 2/1982 | Reynolds | 307/66 |
| 4,325,095 | 4/1982 | Hart | 363/98 |

FOREIGN PATENT DOCUMENTS

| | | | |
|---|---|---|---|
| 2724741 | 12/1978 | Fed. Rep. of Germany | 363/56 |
| 2408237 | 7/1979 | France | 307/66 |
| 1380730 | 1/1975 | United Kingdom | 363/42 |

OTHER PUBLICATIONS

Conference: IAS Annual Meeting 1980, Cincinnati, OH, USA, 28 Sep.-3 Oct. 1980, pp. 705-714.
Fuji Elect. Rev. (Japan), vol. 24, No. 2, pp. 67-71, 1978.
Conference: INTELEC. 79, International Telecommunications Energy Conference, Wash., D.C., USA, pp. 350-353, (26-29 Nov. 1979).

Primary Examiner—William H. Beha, Jr.
Attorney, Agent, or Firm—Milton E. Kleinman; John F. Ohlandt

[57] ABSTRACT

Current overload protection is provided for an inverter of an uninterruptible power supply system; a shutdown circuit responds when a current overload is present, and a plurality of at least three comparators having different input threshold and different time delays at their respective outputs operate such that when an extreme overload occurs, the inverter will be shut down immediately, whereas it will be shut down after predetermined longer periods with correspondingly lesser amounts of current overload present.

5 Claims, 6 Drawing Figures ic # CURRENT OVERLOAD PROTECTION FOR INVERTER OF UNINTERRUPTIBLE POWER SUPPLY SYSTEM

BACKGROUND OF THE INVENTION

1. Field of the Invention

This invention relates to power supply systems and, more particularly, to control arrangements for an inverter adapted to supply power in an uninterruptible system; that is to say, a system in which the load is critical and requires a continuous source of power. If the main power supply should fail, the load, for example, a computer or the like, would not lose its memory contents since an emergence power supply is always available. Moreover, in such system it is required that transfer to the emergency power supply (namely, battery) be instantaneous, and that the emergency supply be extremely well regulated.

Accordingly, it is extremely important to be able to control the inverter in such a critically vital system and to protect it against all kinds of malfunctions and hazards to which it may become exposed.

2. Background Art

In order to provide background material for an understanding of one context in which the present invention may be incorporated, reference may be made to U.S. Pat. No. 3,999,077. In such patent, an uninterruptible power supply system is disclosed and the general layout for the system is depicted. The system of that patent provides a fault detection means, which actuates a transfer switch if the main power fails, so as to cause the batteries, which are continuously charged from a rectifier, to supply power to the load; alternately, if the inverter should develop a fault, the fault detection means will cause the inverter to be disconnected from the system.

In contrast to the system of U.S. Pat. No. 3,999,077, the present invention provides that the power is instantly available to the load. Since a transfer switch is not required, the delay due to such transfer switch is avoided. This is referred to as an on-line system.

A typical inverter circuit that may be used in an uninterruptible or similar power supply system can be appreciated by reference to U.S. Pat. No. 3,376,493. In that patent a control oscillator is disclosed, such oscillator furnishing square wave signals to an inverter circuit which includes SCR devices.

SUMMARY OF THE INVENTION

A primary object of the present invention is to provide improved controls for an inverter adapted to supply power in an uninterruptible supply system.

Another object is to provide such improvements with low cost and simplicity in construction.

Yet another object is to provide improved controls whereby the inverter circuit has a high degree of efficiency and reliability.

A particularly critical problem that occurs in the operation of certain bridge inverter circuits is the potential destruction of the inverter due to so called "shoot-through" currents. Thus, for example, if complementary devices which are in series on one side of a bridge inverter are accidentally turned on simultaneously there is this possibility of destruction of the inverter. Ordinary current feedback that is situated in the load circuit will not detect such "shoot-through" currents and will be totally ineffectual in preventing destruction.

Accordingly, it is also a principal object of the present invention to provide an inverter overload protection means that will solve this problem by rapidly shutting down the inverter.

It is, therefore, a primary feature of the present invention to have a protection means, including a low cost current-sensing resistor, judiciously connected to the bridge inverter so as to sense such "shoot-through" currents. Protection is fully achieved by having the current-sensing resistor in series with respect to the dc supply, and hence in series with the complementary bridge transistors, so that accidental simultaneous turn-on of both of these transistors results in a heavy current flow through the resistor. This heavy flow of current is sensed and transmitted through appropriate circuitry so as to affect the inverter operation, i.e. to shut it down completely during the presence of such overload. Preferably, the current sensing or protection means is connected to a comparator to which the output of a controlling pulse generator is also connected. The operation is such that when an excessive or overload current is detected, an appropriate signal is sent from the comparator to produce shutdown of the inverter.

A further primary feature of the present invention resides in the provision of a means for synthesizing the control signals for the bridge inverter, including a unique pulse generator for generating the control signals that are transmitted to said inverter; specifically, for feeding input signals to the bases of Darlington transistor pairs connected in the bridge inverter configuration. The pulse generator is constituted of a first section for generating a step wave form including de-multiplexing means at the output of said section; Also included is a second section adapted to develop a triangular wave form. The outputs of these two sections are taken to a comparator which provides at its output a trapezoidal-like multiple pulse modulation; in other words, a pulse form that is essentially a series of steps. The exact shape will be appreciated as the description proceeds.

Another feature or aspect of the present invention involves "snubbing" means for limiting the rate of rise of voltage across the transistors in the bridge inverter, such means including an arrangement in each of the symmetrical legs of the inverter; that is to say, connected across each of the Darlington pairs is a series arrangement of a diode and capacitor, and including a resistor in shunt with the diode. These work in conjunction with an air core choke (non-saturable) in series with the bridge.

Other and further objects, advantages and features of the present invention will be understood by reference to the following specification in conjunction with the annexed drawing, wherein like parts have been given like numbers.

BRIEF DESCRIPTION OF DRAWING

FIG. 2 is subdivided for convenience into 2A, (upper left), 2B (upper right), 2C (lower left), and 2D (lower right).

DESCRIPTION OF PREFERRED EMBODIMENT

Figure 1:
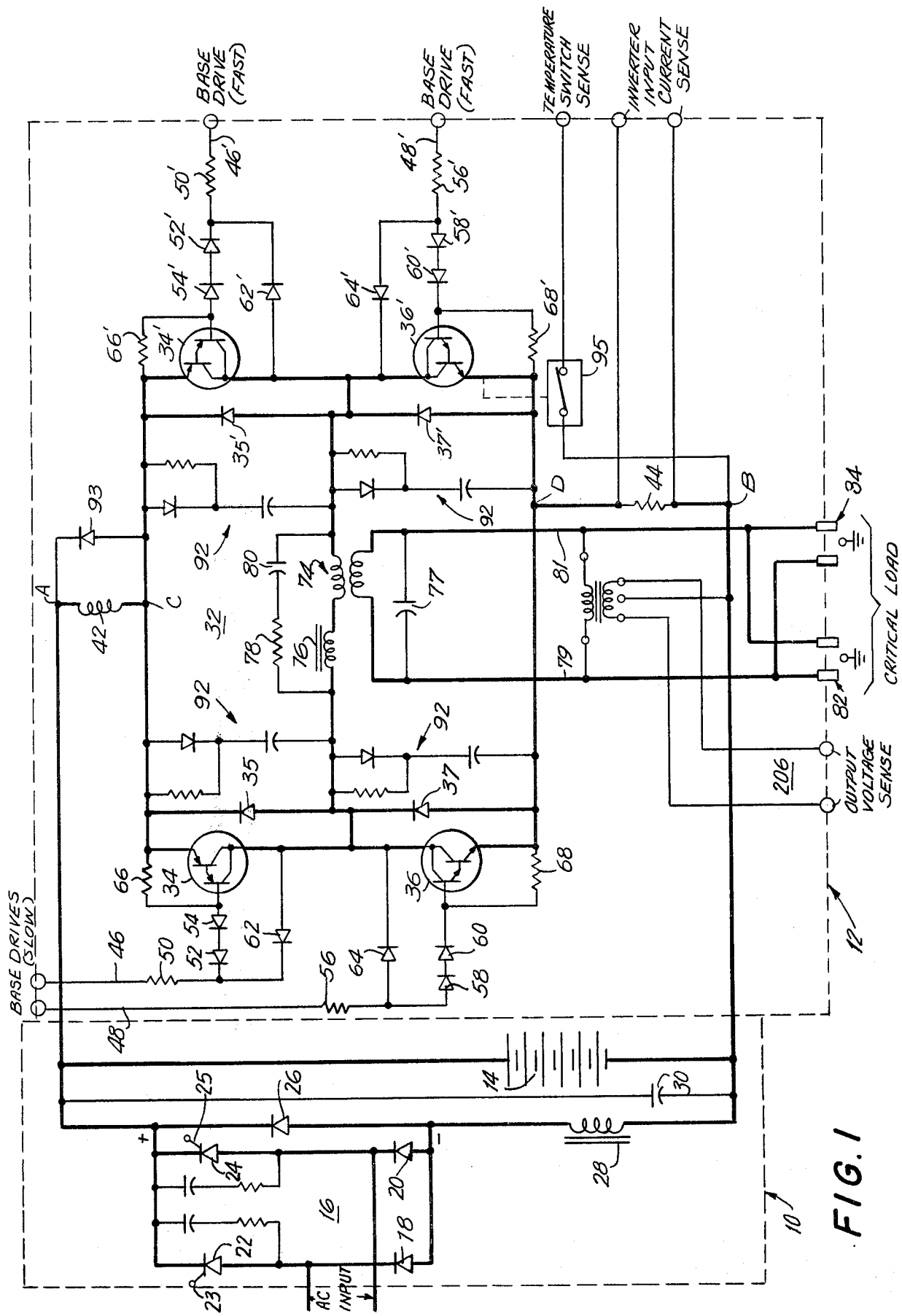
FIG. 1 is a schematic diagram of the inverter circuit of the present invention seen connected to a rectifier and battery for operation in a complete system.

Referring now to FIG. 1, there will be seen a schematic diagram of two of the essential elements or constituents of the system of the present invention. These two constituents are designated 10 and 12, the first of which includes a battery 14 and a bridge rectifier 16. This bridge rectifier 16 is of conventional construction, being of the semi-converter type in which two diodes 18 and 20 are included in two of the legs of the bridge, while the other two legs include silicon controlled rectifier devices 22 and 24. These two SCRs have a common cathode connection to the positive output terminal at the upper end of the bridge rectifier. If desired the positive terminal may be connected to a current sensing resistor for sensing the rectifier output current.

At the lower end of the bridge rectifier 16, the anodes of diodes 18 and 20 are connected to the negative output terminal. Moreover, at the output, a diode 26 is connected across the positive and negative output terminals of the bridge rectifier, and a choke 28 is provided in the negative leg. A capacitor 30, for filtering purposes, is connected in parallel with the series connection of diode 26 and choke 28.

It will be understood that the primary source of AC, connected to the input of the rectifier configuration 10, is rectified to DC and, under the conventional control provided at the gates 23 and 25 of the SCRs 22 and 24 respectively, a well regulated DC output will be provided to the inverter circuit 12. This source of DC will be such as to continuously charge battery 14 on a trickle charge basis. If the primary AC source should fail, then battery 14 will supply the DC power to the inverter circuit 12, without any mechanical or electronic switching action taking place.

Included in the inverter circuit 12 is a bridge 32 of complementary transistors, with a Darlington pair of transistors 34, 36, 34' and 36' in each of the respective legs of the bridge. Each of the pairs is protected by a diode to protect against reverse voltage. Also, when the load is reactive, the diodes also serve to return current to the battery. These diodes are designated 35, 37, and 35', 37'. It will be noted that since this bridge inverter 32 is symmetrical, prime numerals have been used to refer to symmetrical parts, and will be used hereafter.

It will be seen that DC power from the bridge rectifier 16 is applied by way of terminals A and B and through a choke 42, seen above the bridge inverter 32, and a sensing resistor 44, seen below the inverter. The input points for the bridge inverter 32 are designated C and D. Thus, it will be appreciated that the negative side of the bridge inverter 32 is connected to the negative side of the rectifier and battery through the current sensing resistor 44. This sensing resistor 44 is part of the inverter overload protection means; that is, the arrangement which eliminates the problem of shoot-through currents previously alluded to. This arrangement will be explained in further detail hereinafter. In the event of a shoot-through current, choke 42 limits the rate of rise of current in the inverter so that the protective shutdown circuitry to be described will be able to act effectively before the inverter is damaged.

The modes of the Darlington pairs 34 and 36 are complementary; likewise for the pairs 34' and 36'. Thus it will be appreciated that pairs 34 and 34' are pnp, whereas pairs 36 and 36' are npn. Accordingly, the base drives for the complementary pairs of transistors are applied alternately by opposite polarity signals on the signal lines 46 and 48; likewise, on the signal lines 46' and 48'. Included at the input to transistor pair 34 is a network comprising a resistor 50 and diodes 52 and 54; in the case of transistor pair 36, the resistor is designated 56 and the diodes 58 and 60. Diodes 62 and 64 are connected respectively between the collector and the base input of transistor pairs 34 and 36. Also, resistors 66 and 68 are respectively connected between the base inputs and the emitter of one of the transistors in the pairs 34 and 36. The same networks as just described are also provided for the transistor pairs 34' and 36' in the symmetrical legs of bridge inverter 32. Such a configuration of diodes forms the well known "Baker clamp", which serves to prevent hard saturation of the transistors.

As indicated by the designation "slow" for the lines 46 and 48, the transistor pairs 34 and 36 are switched at a rate equal to the output frequency (60 cycles) and thus determine the polarity of the output voltage. As also indicated by the term "fast" applied to the drive lines 46' and 48', the transistor pairs 34' and 36' are operated at a much higher frequency (960 cycles), and with pulse width control, such that the output voltage is switched from the battery voltage to zero at a rate greater than the output frequency. Thus the output circuit receives a voltage which is comprised of several pulses in each half cycle, and of course with half cycles of alternate polarity. The pulse width of the individual pulses is controlled so as to achieve two goals; namely, output voltage regulation, and a close approximation to a sine wave so that output filtering requirements are minimized.

It will, therefore, be understood that the AC output is developed by reason of the joint conduction of diagonally opposite transistor pairs such that alternate half waves are provided by transistors 34 and 36' operating together, whereas the opposite half waves are developed when transistor pairs 34' and 36 are operating together.

The AC output of bridge inverter 32 is coupled to the load by way of transformer 74. Choke 76 in series with the primary winding of transformer 74, and capacitor 77 across the secondary winding, constitute a filter which reduces the harmonics in the output of the unit. Resistor 78 and capacitor 80 form a snubber which is connected across the primary winding of transformer 74 and choke 76, which are in series. This snubber protects the inverter bridge 32 from voltage surges resulting from rapid changes in load current.

The output voltage developed at the secondary of transformer 74 is applied by way of the lines or busses 79 and 81 to output jacks 82 and 84 respectively, whence it is transmitted to a user's critical load; that is to say, to a load as described, which must be continuously supplied with power as for example, a computer or the like.

One of the features of the invention will be seen in the inverter circuit of FIG. 1. Thus, in each of the symmetrically arranged legs of the bridge inverter 32, is a snubber network 92. Such network in each leg includes a resistor and diode in parallel, and a capacitor. These snubber networks 92 operate in conjunction with the choke 42 in the positive lead from the DC supply. They limit the rate of voltage across the transistors. This choke is shunted by a "free-wheeling" diode 93 which prevents a voltage surge when the current in the choke is suddenly reduced in magnitude.

A primary feature of the present invention resides, as has been noted, in the specific arrangement of the current overload protection means; by sensing the inverter current in the negative leg, rather than in the output of the inverter or in the primary of the transformer 74, the advantage is gained of sensing load current and any current which might, due to a fault, flow through either the right or left side of a bridge so as to constitute a very dangerous "shoot-through" of current through the low impedance path comprised of the choke 42 and either the pairs of transistors 34 and 36 or 34' and 36'.

The complete arrangement for controlling the bridge inverter is responsive to a variety of conditions, including inverter current overload, & will now be described.

Figure 2A:
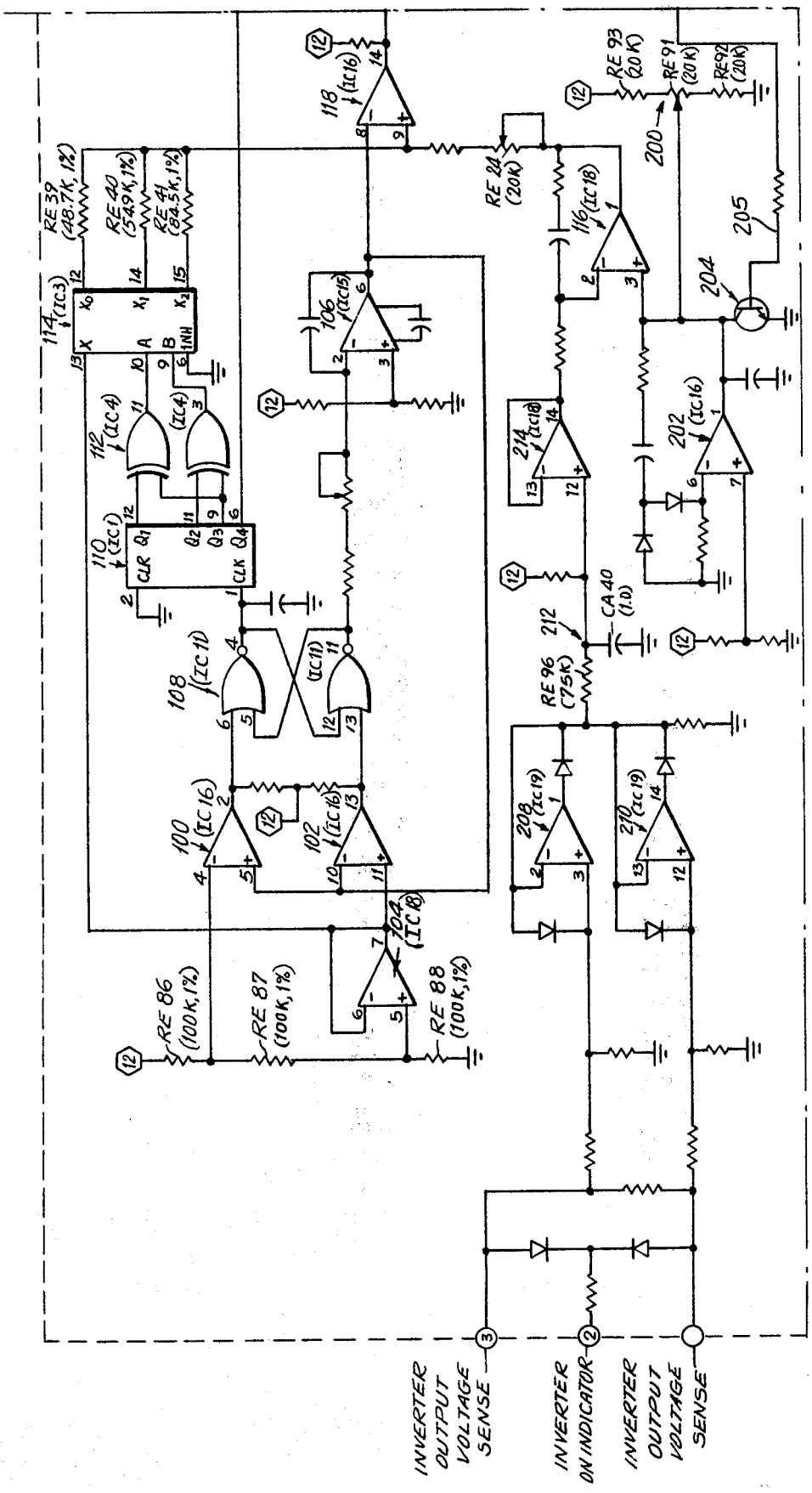
FIG. 2 is a schematic diagram in some detail illustrating the inverter control circuitry in accordance with the present invention, and particularly illustrating the pulse generator for controlling the inverter.
Figure 2B:
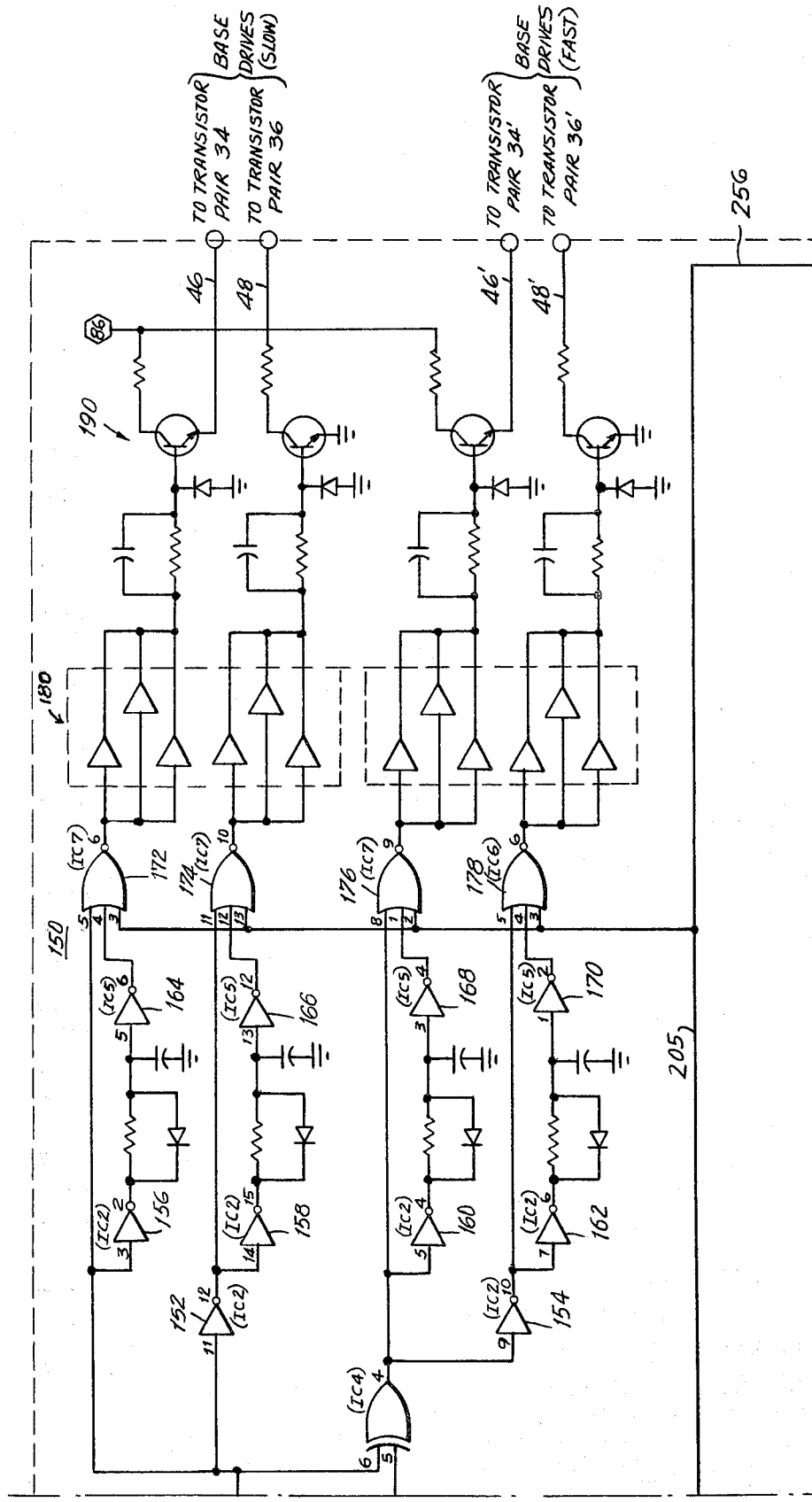
Figure 2C:
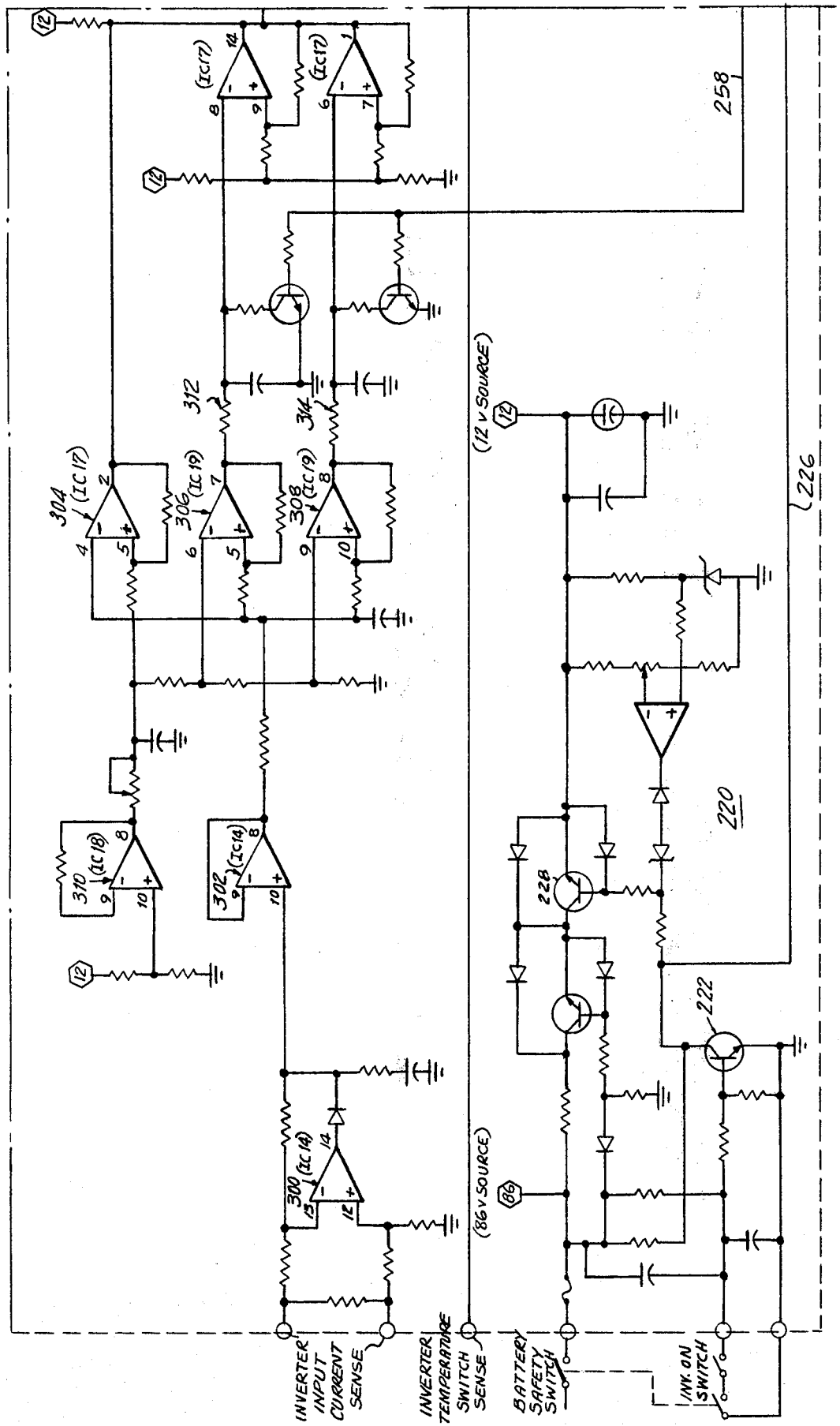
Figure 2D:
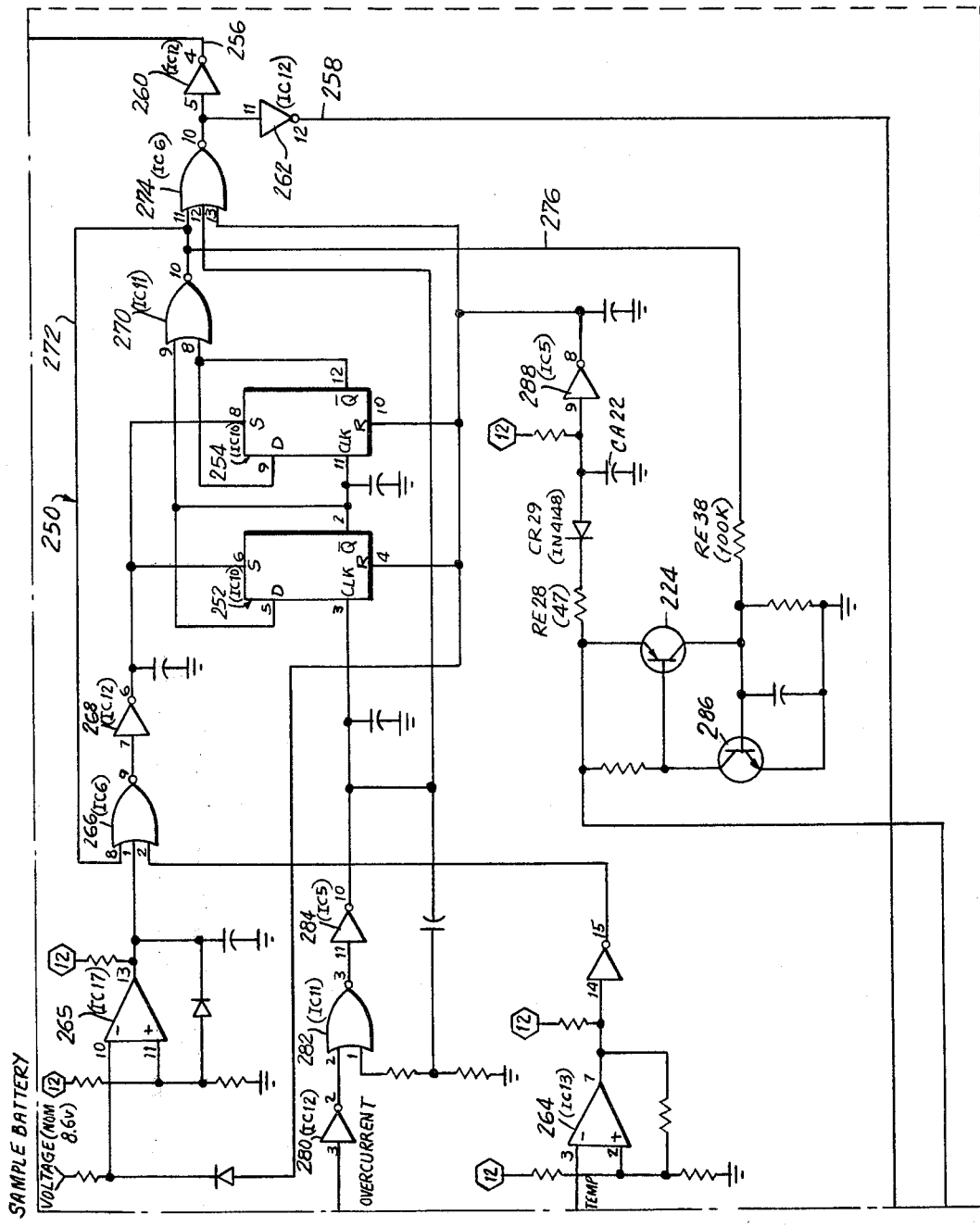
Figure 3:
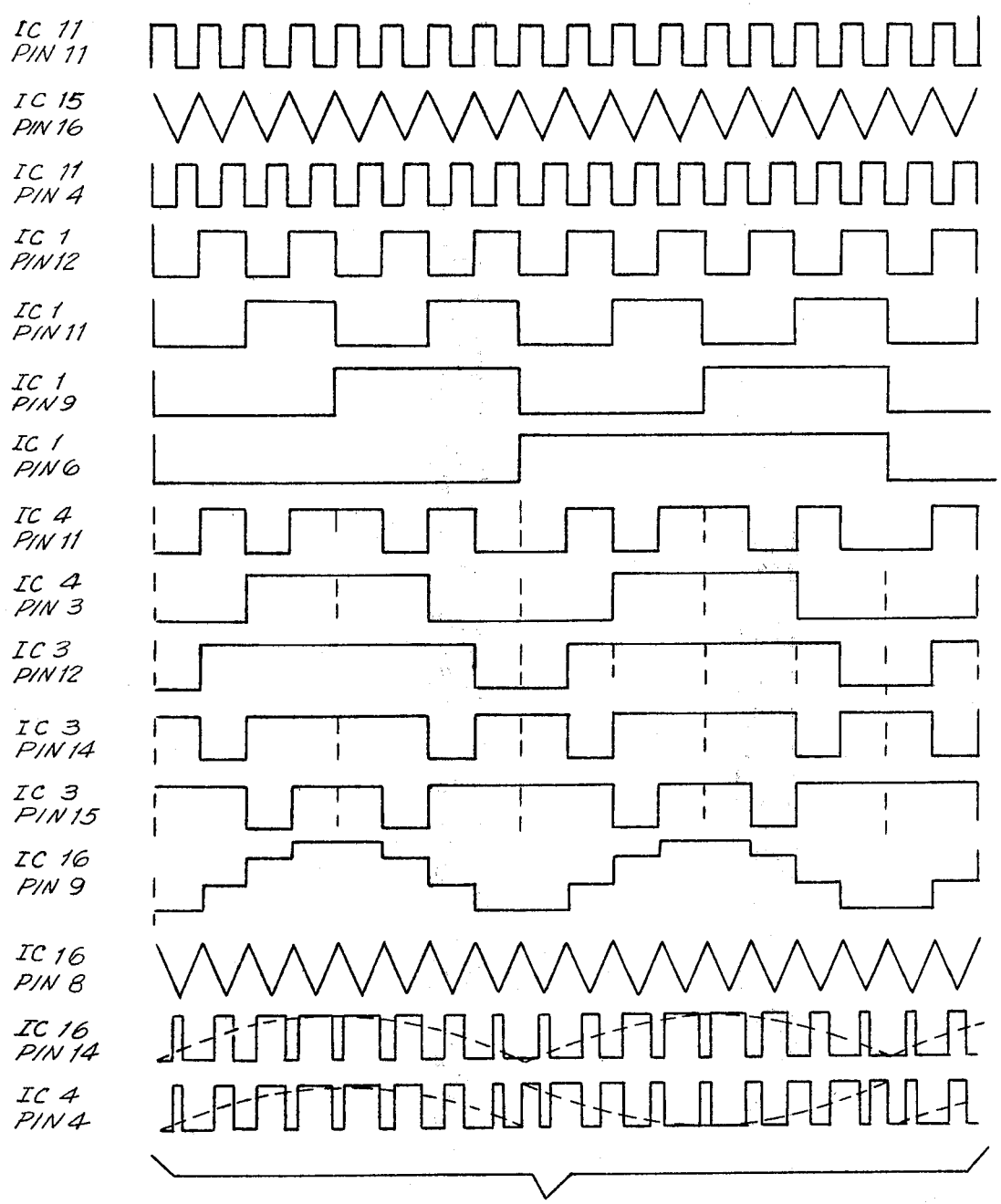
FIG. 3 is a diagram illustrating pulse wave forms at various points in the circuitry of FIG. 2.

Referring now to FIGS. 2 and 3, the inverter control circuitry will be seen in FIG. 2; the pulse wave forms occurring at the various points during operation will be appreciated from FIG. 3. Starting at the upper left corner of the inverter control circuitry, resistors RE86, 87, and 88, establish two voltage limits of approximately four and eight volts. Eight volts is applied directly to input pin 4 of comparator 100 (IC16) and four volts is applied to input pin 11 of comparator 102 (IC16) via the voltage follower 104 (IC18) with an output at pin 7. Inputs, pin 5 and pin 10 of comparators 100 and 102 respectively (IC16), are fed back from the output of triangular wave generator 106 (IC15). When the triangular wave reaches and exceeds eight volts, the output at pin 2 of comparator 100 (IC16) goes positive, which sets the output of the flip-flop 108 which comprises the two NOR gates (IC11), with outputs at pin 4 and pin 11, so that pin 4 is negative and pin 11 is positive. This causes the triangular wave generator 106 (IC15), with output at pin 6, to begin falling from eight volts to four volts. When this voltage falls below four volts, the output of comparator 102 (IC16), pin 13, goes positive, thereby causing the flip-flop 108 to change polarity so that the output at pin 11 is negative and the output at pin 4 is positive (FIG. 3). This reverses the input to the triangular wave generator and again causes the voltage to ramp up. Thus, there is a triangular wave at the output of generator 106 (IC15 pin 6).

Counter 110 is a seven-stage binary counter, or frequency divider, of which only the first four stages are used. It is continuously clocked by the output of the flip-flop 108 (IC11 pin 4), at a 960 Hz rate. The outputs of counter 110 are at pins 12, 11, 9, and 6 and their pulse wave forms will be seen in FIG. 3. Three of the outputs of this counter are fed through a pair 112 of exclusive OR gates (IC4), having outputs at pin 3 and pin 11. The outputs of these exclusive OR gates are fed to the controlling inputs, A and B, of a demultiplexer 114 (IC3). Each half-cycle of the fundamental is divided into eight equal time periods in the operation of this circuit. When operating at 60 Hz the frequency at the clock input to the counter 110 (pin 1 of IC1) is 960 Hz. The output of the binary counter on Q1 through Q4 (pins 12, 11, 9, and 6 of IC1) is a binary count from zero through seven with the output at Q4 low; and then another count from zero through seven with the output at Q1, a high. This is continuously repeated. The output of 112 (IC4, pin 11) is 0,1,0,1,1,0,1,0 during the eight counts. At pin 3 it is 0,0,1,1,1,1,0,0. At the output of the demultiplexer 114, we have $X_0, X_1, X_2, X_3, X_3, X_2, X_1, X_0$ in each of these eight time periods.

The X input (pin 13) to the demultiplexer 114 is taken from voltage follower 104 (IC18 pin 7), which is held at 4 volts.

The output resistor values R39, 40, and 41 were determined experimentally by adjusting these values to achieve minimum harmonics at the output of the inverter. To complete the logic here, the resistance for output $X_3$ (not shown) is infinite. The output of the resistors as selected by the demultiplexer is a step-wave form at the fundamental frequency shaped to approximate the desired sinewave.

At the peak voltage of the stepped wave, the voltage at op amp 116 (IC18), pin 1, is compared directly with the triangular wave from generator 106; these are at pin 9 and pin 8 of comparator 118 (IC16), respectively. As the voltage at pin 9 increases, the conduction angle increases, and in fact, for the two time periods at the center of the wave form, the current can flow continuously. In the other six time periods of the half-cycle, the conduction time will always be less than the full one-eighth half-cycle because resistors R39, 40, and 41 reduce the voltage at pin 9. Resistor R24 is used to experimentally minimize the harmonic voltages out of each individual unit.

Drive signals for the left hand transistors (pairs 34 and 36) in the bridge inverter 32 (schematic of FIG. 1) are derived from output Q4 (60 cycle) of counter 110 (IC1), and are further processed by the circuitry 150 at the top righthand side of the inverter control schematic (FIG. 2B). The output at line 46 is the inverse of the output at line 48 due to the action of the first inverter stage 152 of IC2, (i.e. inverter pins 11, 12). Similarly the output at line 46' is the inverse of the output at line 48' due to inverter stage 154 of IC2 (pins 9 and 10). The combined action of the other inverter stages 156, 158, 160 and 162 of IC2, the RC networks and inverter Schmitt triggers 164, 166, 168 and 170 (IC5), as seen for each of the four circuits of 150, is to cause a dead time in the output; that is, a period of time when neither line 46 nor line 48 on the one hand, and when neither line 46' nor line 48' on the other hand, are on at the same time. This is achieved because when any of the four inputs goes low, there is a delay before the RC time constant permits the Schmitt trigger output to go low. This results in the delay of the positive going pulses out of the NOR gates 172, 174, 176, and 178 (IC7 pins 6, 10, and 9 and IC6 pin 6). This dead time is required to allow a transistor to turn off before the transistor in series with it is turned on. This is required because of the storage time of the transistors. The buffers 180 and output transistors 190 in the output stages of circuitry 150 are conventional in nature.

The already noted operational amplifier 116 (IC18), seen near the center of FIG. 2, is the main voltage control circuit. Its input at pin 3 is a voltage taken from the voltage divider 200, comprising resistors RE93, RE91 and RE92 which provides the reference voltage for the circuit. By adjusting RE91 the output voltage is effectively controlled. The operational amplifier 202 (IC16), with output pin 1, is used to permit the voltage at the input to amplifier 116 on pin 3 to increase gradually when power is applied. This causes the output voltage of the UPS to increase gradually or "walk-up". The walk-up circuit is reset by transistor 204, due to input signals appearing on line 205, when the shutdown circuit 250 is operated so that the unit will again "walk-up" when the unit restarts.

The inverter output sense voltage (seen on the left, terminals 2 and 3), which is fed from circuit 206 (FIG. 1), is rectified by the two op amps 208 and 210 (IC19) with outputs at pin 1 and pin 14. This rectified output voltage is then filtered by the network 212, comprising RE96 and CA40. This is to remove the ripple which results from the rectification. The voltage follower 214 (IC18), with output at pin 14, merely decouples the feedback to amplifier 116 (IC18, pin 2) from the filter.

Referring now to the lower parts of FIG. 2 (FIG. 2C and FIG. 2D) the power supply designated 220 is seen in the lower left, functioning to supply 12 volts for the operation of most of the components of the control circuits, and 86 volts for a limited number of these components. It also supplies a signal to reset the shutdown and walk-up circuits when the inverter "ON" switch is opened. When the inverter switch is opened, transistor 222 conducts and pulls the voltage of the emitter of transistor 224 (FIG. 2D) down, due to the connection by way of line 226, thereby resetting the latch composed of transistors 224 and 286. Transistor 222 also deprives transistor 228 of base drive, thus shutting down the 12 volt supply.

The shut down circuit 250 (FIG. 2D) functions in response to inverter current overload and comprises, or is composed of flip-flops 252 and 254 (IC10), with outputs at pin 2 and pin 12 respectively. This permits a count of three before the shut down lines 256 and 258, which extend from the outputs of inverter buffers 260 and 262 (IC12, pins 4 and 12) respectively, are actuated.

In addition to responding to an inverter circuit overload, the shut down circuit 250 responds to other dangerous conditions. Thus an overtemperature signal from voltage comparator 264 (FIG. 2D), responsive to the actuation of temperature switch 95 (FIG. 1), will result in the NOR gate 266 (IC6) operating such that its output at pin 9 will go low. Also, low battery voltage sensed by comparator 265 will likewise cause the NOR gate 266 output at pin 9 to go low. This in turn, by way of inverter 268 (IC12, with output at pin 6), will set the flip-flops 252 and 254 so that their outputs at pins 2 and 12 respectively will go low, thereby generating a signal which will cause the output at NOR gate 270 (IC11, pin 10) to go high, such that the fault is latched by reason of feedback line 272.

It should be noted however that when an overcurrent is sensed, there is additional processing before such condition affects the shutdown lines. Referring now particularly to FIG. 2C, the inverter input current sense terminals transmit the voltage received from sensing resistor 44 to the input of operational amplifier 300. A second stage operational amplifier 302 feeds the received signal to the inputs of comparators 304, 306, and 308, each of which has another respective input connected to the output of another operational amplifier 310. The outputs of comparators 306, 308, are provided with respective RC networks 312 and 314, the latter having a time constant of approximately 30 seconds and the former a time constant of approximately one second.

In the case of extreme overcurrent, operational amplifier 304 (IC17 at pin 2) functions so as immediately to cause a shutdown and will cause the counter 252 to count one step. This results due to the connection from comparator 304 by way of inverter 280 (IC12), NOR gate 282 (IC11) and Schmitt trigger 284 (IC5). The shutting down of the unit will cause the overcurrent to be eliminated, which will allow the shutdown lines 256 and 258 to go low again. If an overcurrent now recurs, the counters will again be clocked. This will happen three times and then the counters will latch the shutdown to the high position and keep it there by way of NOR gate 270 and the feedback line 272. Lower values of inverter overcurrent cause the circuit to operate after a delay, in accordance with the respective two different time constants of networks 312 and 314, which respond to the individual input thresholds of comparators 306 and 308.

When the output of NOR gate 270 (FIG. 2D) goes high, this is transmitted by line 276 to transistor 286; specifically, its base goes high by way of resistor RE38. This turns on transistor 286 and thereby turns on transistor 224, which discharges capacitor CA22 through diode CR29 and resistor RE28. The output of Schmitt trigger 288 (IC5, pin 8) then goes high which latches the shutdown signal by way of pin 13 of NOR gate 274 (IC6); resets the counters 252 and 254, by way of input pins 4 and 10 respectively (IC10); and raises the signal level at pin 10 of comparator 265 (IC17) to 12 volts, thereby eliminating any low battery signal. Transistor 224 also deprives transistor 228 of base drive, thus shutting down the 12 volt supply.

As noted previously, when the inverter ON switch at the lower left in FIG. 2C is opened, this causes transistor 222 to conduct current at which time it starves the latch comprising transistor 224 and 286 (FIG. 2D), causing them to be turned off; then when the inverter switch is again closed, CA22 can recharge or "walk in", thereby permitting Schmitt trigger 288 (IC5 pin 8) to go low so that the circuit is again ready to function.

While there have been shown and described what are considered at present to be the preferred embodiments of the present invention, it will be appreciated by those skilled in the art that modifications of such embodiments may be made. It is therefore desired that the invention not be limited to these embodiments, and it is intended to cover in the appended claims all such modifications as fall within the true spirit and scope of the invention.

What is claimed is:

1. Apparatus for providing a regulated uninterruptible AC output to a critical load comprising:
a bridge rectifier having an AC supply at its input, said bridge rectifier including a diode in each of a first pair of its legs and a silicon controlled rectifier in each of another pair of its legs;
a DC supply connected across the output of said bridge rectifier;
a bridge inverter connected to supply AC power to said critical load, each half of the bridge inverter including at least one transistor of given conductivity-type in an upper leg thereof, and at least one transistor of opposite conductivity-type in a lower leg thereof, said transistors being connected in series with said DC supply;
a current overload protection means including a current-sensing resistor directly connected in series between the emitter of the transistor in the lower leg of each half of said bridge inverter and one terminal of said DC supply;
means for responding to voltage across the sensing resistor to shut down the bridge inverter, including a shutdown circuit, and means for connecting said current overload protection means to said shutdown circuit, said shutdown circuit including at least three comparators connected to a common input, said comparators having different input thresholds and different time delays at their respective outputs such that when an extreme current overload occurs, said inverter is shut down immediately, whereas it is shutdown after predetermined longer time periods when correspondingly lesser amounts of current overload are present, said shutdown circuit further comprising means for shutting down the bridge inverter in the event of excess temperature and low battery voltage, said shutdown circuit also including a first NOR circuit for responding to an over temperature signal and a low battery voltage signal, first and second flip-flops for responding to the output condition of said first NOR circuit and for responding to an over current signal, a second NOR circuit connected to respective outputs of said first and second flip-flops, and a feedback line connected from the output of said second NOR circuit to the input of said first NOR circuit for latching the output condition of said second NOR circuit.

2. Apparatus as defined in claim 1, in which each leg in said bridge inverter includes a pair of Darlington connected transistors, and control lines for transmitting drive signals to the inputs of said transistors.

3. Apparatus as defined in claim 2, in which the pairs of said Darlington connected transistors in the upper and lower legs of respectively opposite halves of said bridge inverter are rendered conductive and non-conductive at two different pulse repetition rates, while the pairs in the upper and lower legs of a given half are rendered conductive and non-conductive at the same pulse repetition rate.

4. Apparatus as defined in claim 3, in which the control or base drive signals for one pair of transistors are at a frequency of sixty cycles.

5. Apparatus as defined in claim 1, further comprising a snubber means for limiting the rate of rise of voltage across the transistors in said legs of the bridge inverter, each of said snubber means including a resistor in series with a capacitor connected across said pairs of transistors, and a diode in parallel with said resistor, in conjunction with an air choke in series with the bridge.

* * * * *